S. L. ALLEN, DEC'D.
S. H., C. J., E. R. AND S. J. ALLEN AND E. A. ELFRETH, EXECUTORS.
AGRICULTURAL IMPLEMENT.
APPLICATION FILED FEB. 5, 1917.

1,351,984. Patented Sept. 7, 1920.

WITNESS

UNITED STATES PATENT OFFICE.

SAMUEL L. ALLEN, OF MOORESTOWN, NEW JERSEY; SARAH H. ALLEN, CHARLES J. ALLEN, ELIZABETH R. ALLEN, SUSAN J. ALLEN, AND EMILY ALLEN ELFRETH EXECUTORS OF SAID SAMUEL L. ALLEN, DECEASED.

AGRICULTURAL IMPLEMENT.

1,351,984.  Specification of Letters Patent.  Patented Sept. 7, 1920.

Application filed February 5, 1917. Serial No. 146,653.

*To all whom it may concern:*

Be it known that I, SAMUEL L. ALLEN, a citizen of the United States, residing at Moorestown, in the county of Burlington and State of New Jersey, have invented certain new and useful Improvements in Agricultural Implements, whereof the following is a specification, reference being had to the accompanying drawings.

My invention relates particularly to cultivating implements, and is especially directed to that class of manually propelled devices, commonly known as wheel or slide hoes, which are provided with handles, and which carry tools capable of being interchanged or substituted.

The principal objects of my invention are to provide an implement of the class described which combines simplicity and strength with a wide range of adjustment.

Other objects of my invention are to provide such an implement so constructed and arranged as to be readily adjusted to vary the distance between the tools, to vary the height of the handles and to vary the depth of said tools.

My invention further comprehends an implement that may be interchangeably provided with a carrier having wheels upon which it may be trundled, or with a carrier having sled runners upon which it may be slid.

Specifically stated one form of my invention as hereinafter described comprehends a frame comprising duplicate tool carrying members which are relatively adjustable laterally, and which carry tools such as hoes, cultivator teeth, plows, etc., adjustable thereon to vary their depth with respect to the surface of the ground.

My invention also includes all of the other various novel features of construction and arrangement as hereinafter more definitely specified.

Figure 1:
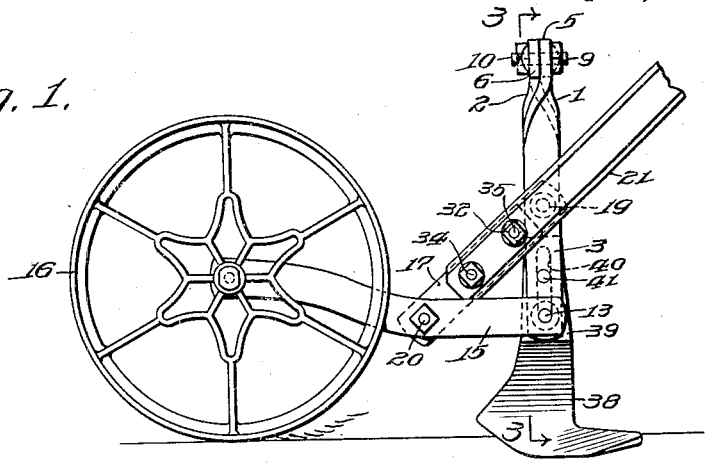
Figure 3:
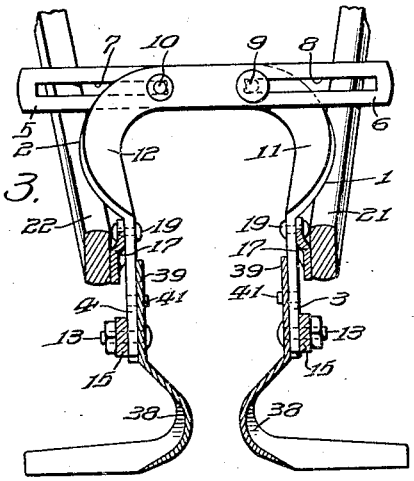
Figure 2:
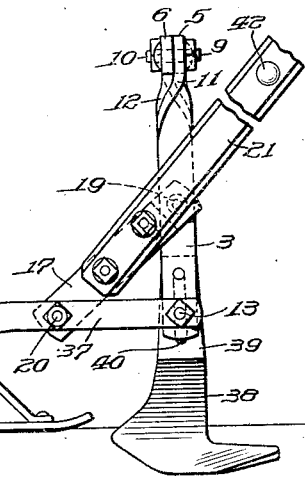
Figure 5:
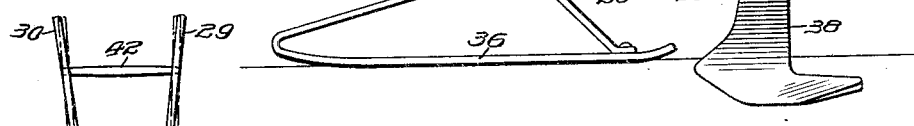
Figure 4:
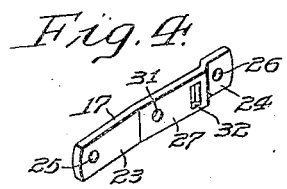

In the accompanying drawings Figure 1 is a side elevational view of an implement constructed in accordance with my invention, provided with a wheel carrier; Fig. 2 is a similar side elevational view of said implement provided with a slide carrier; Fig. 3 is a transverse sectional view of said implement taken on the line 3—3 in Fig. 1; Fig. 4 is a perspective view of the handle bracket; and Fig. 5 is a front elevational view, on a greatly reduced scale, of the handles showing their possible flexibility to accommodate the lateral adjustment of the implement frame. In said figures the frame comprises the duplicate arch members 1 and 2 respectively having tool carrying depending legs 3 and 4, and transverse arms 5 and 6 which are provided with slots 7 and 8 through which adjusting bolts 9 and 10 respectively extend, and by which the frame members 1 and 2 are rigidly held together in any desired adjusted position.

The arms 5 and 6 are connected with the legs 3 and 4 of the respective frame members 1 and 2 by outwardly swinging curved portions 11 and 12 which are twisted to dispose said legs 3 and 4 and said arms 5 and 6 in relatively transverse planes as best shown in Fig. 3.

As shown in Fig. 1 the legs 3 and 4 are connected at their lower ends by bolts 13, with the wheel supports 15 respectively provided at their forward ends with trundling wheels 16 upon which the implement may be trundled.

The legs 3 and 4 of the frame members 1 and 2 are arranged to be held in angular relation by the obliquely disposed brace bars 17, which are secured to the legs 3 and 4 by bolts or rivets 19, and to the wheel supports 15 by the bolts 20, and which serve as handle brackets for the handle bars 21 and 22. As best shown in Fig. 4 the end portions 23 and 24 of said bracket bar 17 are disposed in alinement and afford apertures 25 and 26 for the bolts 19 and 20, while the intermediate portion 27 thereof is inclined outwardly toward its rear end in the plane of the handle bars which diverge toward the handles 29 and 30 shown in Fig. 5.

The inclined portion 27 of the brace bar 17 is provided with the circular aperture 31 and the transversely elongated aperture 32 for the bolts 34 and 35 respectively, which secure the handle bars thereto. The bolt 34 affords a fulcrum upon which the handles may rock, while the aperture 32 permits the bolt 35 when loosened to move transversely of said handle bracket, which permits the handle bars to be set at any desired angle with respect to said bracket as shown in Fig. 2, to vary the height of the handles for the convenience of the operator, and to vary the depth with respect to the wheel or support.

The supporting wheels 16 shown in Fig. 1 may be readily replaced by the slide runners 36 as shown in Fig. 2, which comprise the runner supports 37 connected with the legs 3 and 4 by the bolts 13 and with the brace bars 17 by bolts 20 as are the wheel supports shown in Fig. 1.

The lower ends of the frame legs 3 and 4 are arranged to carry tools 38 which may be of any desired form, having the shank 39 provided with the slot 40 through which the bolts 13 may extend to hold said tool adjusted in different vertical positions, and through which the projections 41 extending from the legs 3 and 4 may extend to maintain said tool in upright position.

It will be obvious that the frame may be adjusted to any desired width to vary the distance between the tools carried thereby, limited of course by the length of the slots 7 and 8, and rigidly secured in such adjusted position by the bolts 9 and 10.

As shown in Fig. 5 the handle bars 21 and 22 are so connected with their brace bars 42 that they may readily accommodate themselves to the adjustment of the frame members 1 and 2, as indicated by the dot and dash lines showing a typical adjustment.

It will be seen that by the triangular arrangement of the members of the opposite sides of the implement a structure having great strength and rigidity is produced, being braced directly in the direction of thrust.

I do not desire to limit my invention to the precise details of construction and arrangement herein set forth, as it is obvious that various modifications may be made therein without departing from the essential features of my invention as defined in the appended claims.

Having thus described my invention, I claim:—

1. An implement of the class described, comprising frame members having transversely extending arms adjustably connected and provided with depending legs, arranged for attaching perpendicularly adjustable ground working tools, carrier supports connected with said legs, and diagonal braces connecting said legs and supports, and serving as handle brackets, said arms and legs being connected by intermediate portions which curve outwardly beyond the plane of said legs.

2. An implement of the class described, comprising an arched frame having transversely disposed slotted arms adjustably connected together, and curving downwardly, outwardly, and then inwardly and twisted into a plane transverse to the plane of said arms, to form opposed depending legs having projections and tools each having a shank provided with a slot adapted to embrace said projection and bolted to the respective legs through said slots.

3. An implement of the class described, comprising depending tool carrying legs forming the opposite sides of the implement frame, having their upper portions curved outwardly and turned inwardly to form transversely extended arms overlapping each other and provided with longitudinal slots and means extended through said slots arranged to rigidly secure said arms together, but permitting their longitudinal adjustment to vary the distance between said tool carrying legs.

4. An implement of the class described, comprising depending tool carrying legs forming the opposite sides of the implement frame, having their upper portions curved outwardly and turned inwardly to form transversely extended arms overlapping each other and provided with longitudinal slots and means extended through said slots arranged to rigidly secure said arms together, but permitting their longitudinal adjustment to vary the distance between said tool carrying legs, tools having shanks provided with slots adjustably carried by said legs, and means on said legs to maintain said tool in upright position.

5. An implement of the class described comprising a tool carrying leg having a projection, a tool having a slotted shank through which said projection extends and means extending through said slot arranged to adjustably secure said tool in different adjusted positions.

6. An implement of the class described, comprising a substantially vertical frame member, a substantially horizontal carrier member secured thereto, a diagonally disposed brace bar having its opposite end portions disposed in substantial alinement and respectively connected to said members, and its intermediate portion relatively inclined and arranged to carry a handle bar connected with said inclined portion, said arms and legs being connected by intermediate portions which curve outwardly beyond the plane of said legs.

In testimony whereof I have hereunto set my hand in the presence of two subscribing witnesses.

SAMUEL L. ALLEN.

Witnesses:
EDWARD W. BURT,
EDWARD L. RICHIE.